United States Patent [19]
Gomi et al.

[11] Patent Number: 5,159,988
[45] Date of Patent: Nov. 3, 1992

[54] ARTICULATED STRUCTURE FOR LEGGED WALKING ROBOT

[75] Inventors: Hiroshi Gomi; Tomoharu Kumagai; Masato Hirose; Masao Nishikawa, all of Wako, Japan

[73] Assignee: Honda Giken Kogyo Kabushiki Kaisha, Tokyo, Japan

[21] Appl. No.: 627,638

[22] Filed: Dec. 14, 1990

[30] Foreign Application Priority Data

Dec. 14, 1989 [JP] Japan ............................ 1-324218

[51] Int. Cl.⁵ ........................................... B62D 57/02
[52] U.S. Cl. .................................... 180/8.6; 180/8.1; 250/231.1; 414/1; 414/5; 901/1; 395/1
[58] Field of Search ................ 180/8.6, 8.1, 8.2, 8.3; 901/1; 414/1, 5; 364/513; 250/229, 231.1

[56] References Cited

U.S. PATENT DOCUMENTS

| | | | |
|---|---|---|---|
| 3,702,999 | 11/1972 | Gradisar . | |
| 4,579,558 | 4/1986 | Ramer . | |
| 4,698,572 | 10/1987 | Stone . | |
| 4,751,868 | 6/1988 | Paynter . | |
| 4,834,200 | 5/1989 | Kajita | 180/8.1 |

FOREIGN PATENT DOCUMENTS

| | | |
|---|---|---|
| 0108657 | 5/1984 | European Pat. Off. . |
| 0399720 | 11/1990 | European Pat. Off. . |
| 62-97005 | 5/1987 | Japan . |
| 62-97006 | 5/1987 | Japan . |
| 47686 | 2/1989 | Japan ........................ 180/8.6 |
| 457468 | 3/1975 | U.S.S.R. ........................ 901/1 |

OTHER PUBLICATIONS

Hitachi Review (1987) pp. 71-78 (8297) Development of the Legged Walking Robot.
International Journal of Robotics Research (8210) (1984) Cambridge, Mass., USA pp. 60-74.

*Primary Examiner*—Mitchell J. Hill
*Attorney, Agent, or Firm*—Lyon & Lyon

[57] ABSTRACT

A legged walking robot such as a two-legged walking robot, for example, has an articulated structure with at least two degrees of freedom, one of which is a degree of freedom for angularly moving a leg in a pitch direction about a first axis of a hip joint assembly, comprising an electric motor for angularly moving the leg in the pitch direction. The electric motor has an output shaft which is axially aligned with the first axis about which the leg is angularly movable in the pitch direction. The articulated structure also has a speed reducer having an input shaft which coaxial with the output shaft of the electric motor. The other degree of freedom is a degree of freedom for angularly moving the leg in a roll direction normal to the pitch direction. The articulated structure also includes a second electric motor for angularly moving the leg in the roll direction and a second speed reducer having an output shaft which is coaxial with a second axis about which the leg is angularly movable in the roll direction.

6 Claims, 5 Drawing Sheets

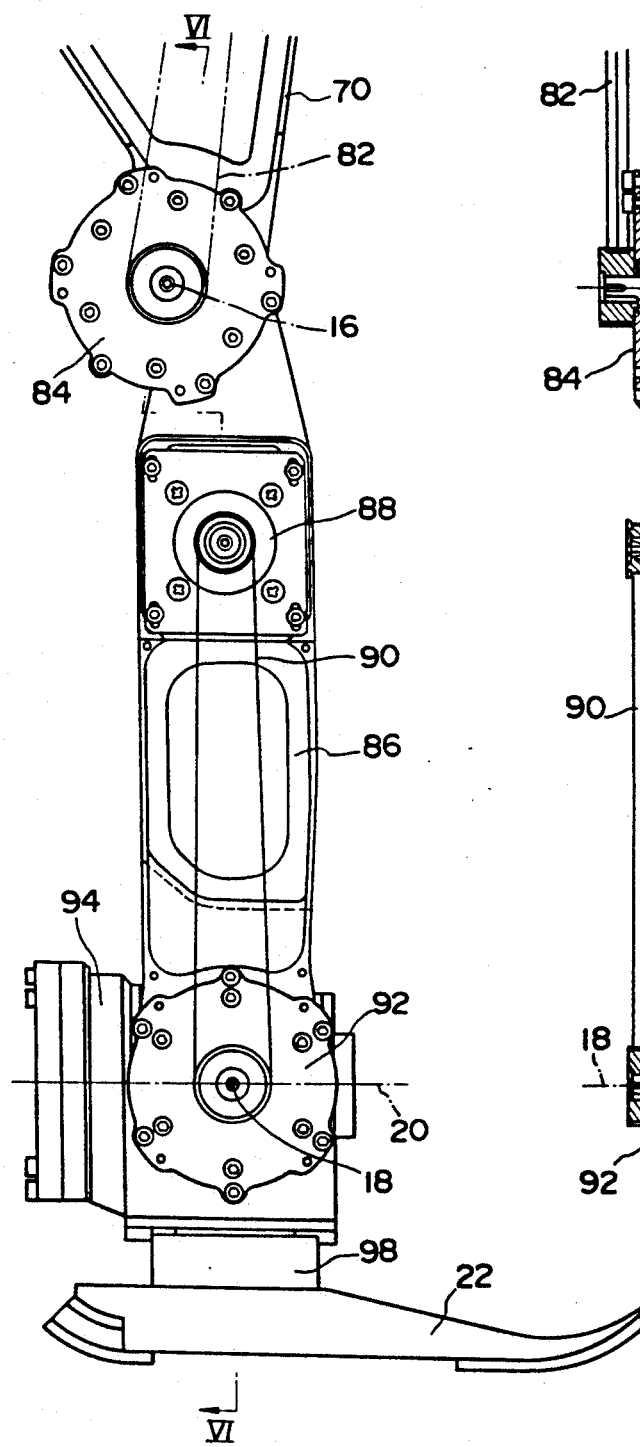
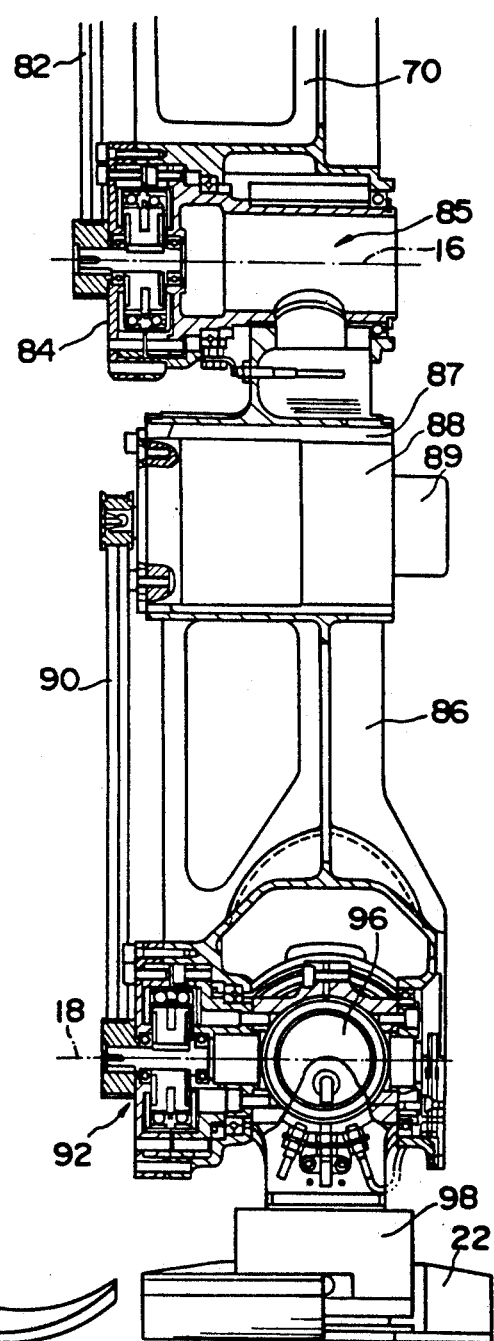

ARTICULATED STRUCTURE FOR LEGGED WALKING ROBOT

BACKGROUND OF THE INVENTION

1. Field of the Invention

The present invention relates to an articulated structure for a legged walking robot, and more particularly to an articulated structure for a legged walking robot, which includes hip joints having moving components whose inertial masses are reduced to effectively lower the energy required to actuate the moving components.

2. Prior Art

There are known legged walking robots having a plurality of legs, such as two-legged walking robots. A study of the motion of moving components of such a legged walking robot indicates that while the body of the legged walking robot moves at a substantially constant speed, the legs are repeatedly accelerated and decelerated to a great degree in each cycle of movement. Actuators associated with the respective articulations or joints of the legged walking robot are required to actuate the inertial masses of leg portions below those joints. Therefore, these joints need to actuate the leg portions with large torques at high speeds, which mean that a large amount of energy is consumed by the actuators to move the robot. However, the consumption by the walking robot of the large amount of energy is not preferable because it reduces the usefulness of the robot.

The legs of a legged walking robot include joints for making motions in a forward direction (hereinafter referred to as a "pitch direction"), a lateral direction (hereinafter referred to as a "roll direction") or a rotational direction, etc. The actuators for actuating the leg portions in the pitch direction are most required to produce large torques at high speeds. This is because the leg portions which are movable in the pitch direction move in a wide range and hence at large accelerations and decelerations, so that they are required to move with large torques at high speeds or high frequencies. As a result, the joints for moving the leg portions in the pitch direction and actuator motors associated with these joints are large and heavy.

Generally, a legged walking robot has a vertical series of joints. Use of actuators which produce large torques at high speeds in combination with the vertical series of joints increases the inertial masses of leg portions that have to be actuated by the actuators in higher positions. Therefore, the actuators in higher positions must be of greater capabilities, with the result that the total weight of the legged walking robot is increased. In connection with the above problem, there has been proposed a legged walking robot which includes intersecting pitch and roll axes in each of its hip joints, as disclosed in Japanese Laid-Open Patent Publications Nos. 62(1987)-97005 and 62(1987)-97006. Each hip joint comprises a hydraulic pump and a hydraulic actuator. However, while the hydraulic actuator is small and powerful, it causes a large energy conversion loss, and the hydraulic pump has to be operated by an electric motor of large capability. Such an actuator assembly is not preferable for the legged walking robots for which only a limited amount of energy is available. At any rate, the proposed legged walking robot does have an articulated structure designed to reduce the inertial masses.

The hip joints of a legged walking robot are complex because they need to have many degrees of freedom. The mechanical components of the legs of the legged walking robot tend to interfere with each other when the joints are actuated. To avoid such a physical interference between the mechanical components, it is necessary to design the robot such that the mechanical components be spaced from each other, e.g., the legs be spaced from each other by a large distance. If the legs are largely spaced from each other, then when one of the legs is in a transfer phase, the weights of the leg in the transfer phase and the body of the robot are applied to the other leg which is in a support phase. With the hip joint of the leg in the support phase, the joint for driving the leg in the roll direction is subjected to the moment caused by the applied weights. Since the imposed moment increases in proportion to the distance by which the legs are spaced apart, the electric motors for actuating the joints on the legs are required to produce large output powers, and the inertial masses to be driven by the motors are large, resulting in an increased amount of energy consumed by the robot. The spaced-apart legs also increase an inertial moment about the vertical axis of the robot body. As a consequence, the robot cannot move lightly.

Legged walking robots have foot and knee joints as well as hip joints. These foot and knee joints are also actuated in the pitch and roll directions. It is desirable that the path along which a leg in the transfer phase is to move be easily calculated in the gait control of the robot. The three joints, i.e., the foot, knee, and hip joints associated with each leg, in the conventional legged walking robots are arranged parallel to each other, making it possible to calculate the path of movement in an orthogonal coordinate system. Since a yaw axis for changing the direction of movement of the robot is disposed on each of the thighs of the robot, however, when the robot is turned, the parallelism of the pitch axes is disturbed by an interference with the yaw axes, with the result that the necessary calculations are rendered highly complex.

The actuators in a legged walking robot are advantageously positioned upwardly of the associated joints in order to reduce the inertial moments applied lower leg portions. With such a construction, the robot has a high center of gravity. Therefore, when a gravitational pull is exerted to the robot, tending to overturn the upper body of the robot at the time the robot is about to stand up, the time required for the robot to fall as an inverted pendulum is long enough for the robot to be controlled to achieve its normal posture. For this reason, it has been proposed to position electric motors upwardly of associated joints and to drive the articulations with belts powered by the motors at suitable power transmitting ratios, as disclosed in *Control of Dynamic Two-Legged Walking Robots*, written by Furusho, Bulletin No. 3, Vol. 1, of Japan Robotics Society.

According to the above known arrangement, since torque of the motors is transmitted by the belts whose speed reduction ratio is usually limited to 3 to 4, the electric motors which are designed to rotate at high speed have to be energized in a low speed range. Inasmuch as the desired torque cannot be produced from the electric motors because of the available speed reduction ratio, the capacity of the electric motors has to be increased. Consequently, the proposed robot structure is not effective enough to reduce the inertial moments. The torque required by the joints is determined necessarily in a quantity required to support the weight of the robot when the robot is about to stand up. The belts which transmit the torque to the joints are thus subjected to strong forces, and hence have to be wide and large enough to withstand the applied forces. With the wide and large belts incorporated in the hit joints, the legs must be designed such that the robot walks bandy-legged in order to avoid the physical interference between the legs.

SUMMARY OF THE INVENTION

In view of the aforesaid shortcomings of the conventional legged walking robots, it is an object of the present invention to provide an articulated structure for a legged walking robot, which is small in size and light in weight, with electric motors used as actuators, and has the electric motors and associated speed reducers arranged appropriately for the effective reduction of inertial masses of moving components of hip joint assemblies.

Another object of the present invention is to provide an articulated structure for a legged walking robot, which has compact hip joints to avoid physical interference between the legs and also to reduce the inertial moments applied to the robot.

Still another object of the present invention is to provide an articulated structure for a legged walking robot, which has three joints associated with each leg that are positioned appropriately with respect to each other for easy calculations of the path along which a leg in a transfer phase moves.

Yet another object of the present invention is to provide an articulated structure for a legged walking robot, which effectively obviates the drawbacks of the conventional legged walking robots, thus reducing the inertial moments applied to the robot and increasing the height of the center of gravity of the robot.

To achieve the above objects, there is provided in accordance with the present invention an articulated structure in a legged walking robot having at least two degrees of freedom, one of which is a degree of freedom for angularly moving a leg in a pitch direction about a first axis of a hip joint assembly, comprising an electric motor for angularly moving the leg in the pitch direction, the electric motor having an output shaft which is axially aligned with the first axis about which the leg is angularly movable in the pitch direction.

The electric motor for moving the leg in the pitch direction, is of the greatest weight, is required to produce a large torque, and is energized most frequently, and the electric motor is positioned to reduce the inertial masses of components therebelow and also to reduce the amount of energy which is to be consumed by the electric motor to actuate the components.

The articulated structure further includes a speed reducer for reducing the speed of rotation from the electric motor while increasing the torque thereof, the speed reducer having an input shaft which coaxial with the output shaft of the electric motor.

The speed reducer whose input shaft is coaxial with the output shaft of the electric motor makes the articulated structure compact.

The other degree of freedom is a degree of freedom for angularly moving the leg in a roll direction normal to the pitch direction. The articulated structure further includes a second electric motor for angularly moving the leg in the roll direction and a second speed reducer for reducing the speed of rotation from the second electric motor while increasing the torque thereof, the second speed reducer having an output shaft which is coaxial with a second axis about which the leg is angularly movable in the roll direction.

The above arrangement allows the compact articulated structure to have a higher center of gravity and also to avoid physical interference between the components thereof.

The leg includes a link positioned vertically downwardly of a point of intersection of the first and second axes about which the leg is angularly movable, the hip joint assembly having an upper member positioned upwardly of the link, the link being rotatable with respect to the upper member with the two degrees of freedom, the second electric motor being fixedly mounted on the upper member, further including means for transmitting the rotation from an output shaft of the second electric motor to an input shaft of the second speed reducer.

The hip joint assembly further includes a second upper member positioned vertically upwardly of the first-mentioned mentioned upper member, the first-mentioned upper member being rotatable with respect to the second upper member about a third axis which extends vertically for a third degree of freedom, further including a third electric motor for turning the leg about the third axis and a third speed reducer for reducing the speed or rotation from the third electric motor while increasing the torque thereof, the third speed reducer having an output shaft which is coaxial with the third axis.

The third electric motor is fixedly mounted on the second upper member, further including means for transmitting the rotation from an output shaft of the third electric motor to an input shaft of the third speed reducer.

The third electric motor is positioned behind and closely to the third axis in a forward direction of the legged walking robot.

The above construction avoids physical interference between the parts of the hip joint assembly, permits the hip joint assembly to have a free posture, and reduces inertial moments about the vertical axis in the hip joint assembly.

According to the present invention, there is also provided an articulated structure in a legged walking robot, having at least three joints with a first degree of freedom for angularly moving a leg in a pitch direction about a first axis of a hip joint assembly, and second and third degrees of freedom for angularly moving the leg in the pitch direction about respective second and third axes, the three joints being arranged such that the first, second, and third axes remain parallel to each other at all times without physical interference with each other.

The positions of the joints can be determined in an orthogonal coordinate system at all times irrespective of movements caused according to other degrees of freedom. The path which is to be followed by the leg in a transfer phase can easily be calculated.

Furthermore, there is also provided an articulated structure in a legged walking robot having two relatively movable links interconnected by a joint, comprising a speed reducer coaxial with the joint, an electric motor disposed upwardly of the speed reducer, for actuating the joint, and means for transmitting rotation from the electric motor to the speed reducer.

With the above arrangement, the inertial mass of the legged walking robot is reduced, and the height of the center of gravity thereof is increased to extend the time required for the legged walking robot to fall over upon a failure. The extended time results in an increased time in which to control the robot to recover its desired posture.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a side elevational view of a leg portion or shank below a knee joint of one of the legs shown in FIG. 1; and a cross-sectional view taken along line VI—VI of FIG. 5.

DETAILED DESCRIPTION OF THE PREFERRED EMBODIMENT

Figure 1:
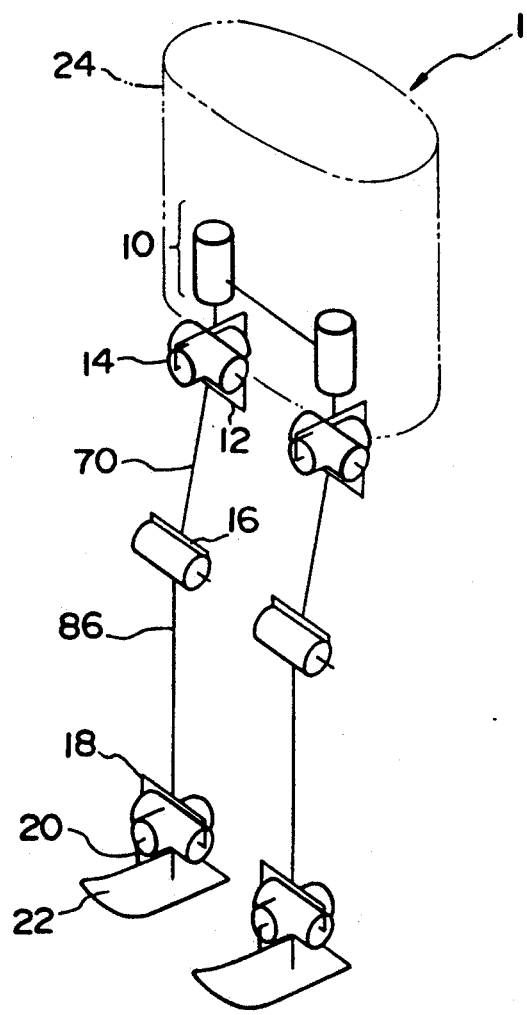
FIG. 1 is a schematic fragmentary perspective view of a legged walking robot incorporating an articulated structure according to the present invention.

FIG. 1 schematically shows a legged walking robot 1, illustrated as a two-legged walking robot by way of example, which includes an articulated structure according to the present invention. The articulated structure of the legged walking robot 1 includes two legs each associated with six articulations or joints (axes). The joints (axes) of each leg include, in the order named from above, a jaw joint (yaw axis) 10 for turning the leg, a pitch joint (pitch axis) 12 on a thigh link 70 for moving the leg in a pitch direction, a roll joint (roll axis) 14 on the thigh link 70 for moving the leg in a roll direction, a joint (axis) 16 in the knee for moving a Shank link 86 in the pitch direction, a joint (axis) 18 on the ankle for moving a foot 22 in the pitch direction, and a joint (axis) 20 in the ankle for moving the foot 22 in the roll direction. Axes 18 and 20 are parallel to the pitch and roll axes, respectively. The foot 22 is mounted on the lower end of the leg. The legged walking robot 1 also includes a body 24 mounted on the upper ends of the legs. The joints (axes) 10, 12, 14 jointly constitute a hip joint assembly, and the joints 18, 22 jointly constitute a foot joint assembly.

On each of the thigh and the ankle of each leg, the two pitch and roll joints are disposed perpendicularly to each other, and have respective axes intersecting with each other at one point. The joints 12, 16, 18 in the hip joint assembly, the knee joint, and the foot joint assembly, respectively, extend parallel to each other. Irrespective of movements caused by other degrees of freedom, particularly, movements of the joint 10 to change the direction of the leg, the joints 12, 16, 18 remain parallel to each other. In the hip joint assembly, the joint 10 and the pitch and roll joints 12, 14 extend perpendicularly to each other, so that the three axes of rotation, representing three degrees of freedom, extend perpendicularly to each other. More specifically, the axis 12 may be considered to define a first axis of the hip joint assembly, the axis 14 to define a second axis of the hip joint assembly, and the axis 10 to define a third axis of the hip joint assembly. The axes 10, 12 and 14 each provide respective degrees of freedom about which the leg of the robot may be moved, for example, the axis 12 provides a first degree of freedom for angularly moving the leg forwardly in the pitch direction, the axis 14 provides a second degree of freedom for moving the leg laterally in the roll direction, and the axis 10 provides a third degree of freedom in the yaw direction for rotating the leg with respect to the upper body 24. It should be understood, however, that the designations "first," "second" and "third" are arbitrary, and are used merely to facilitate description of the invention. Each of the legs of the legged walking robot 1 according to the illustrated embodiment, therefore, has six degrees of freedom. Irrespective of the position or posture of the body 24, the foot 22 can be placed in any position, at any angle, and in any direction.

Figure 2:
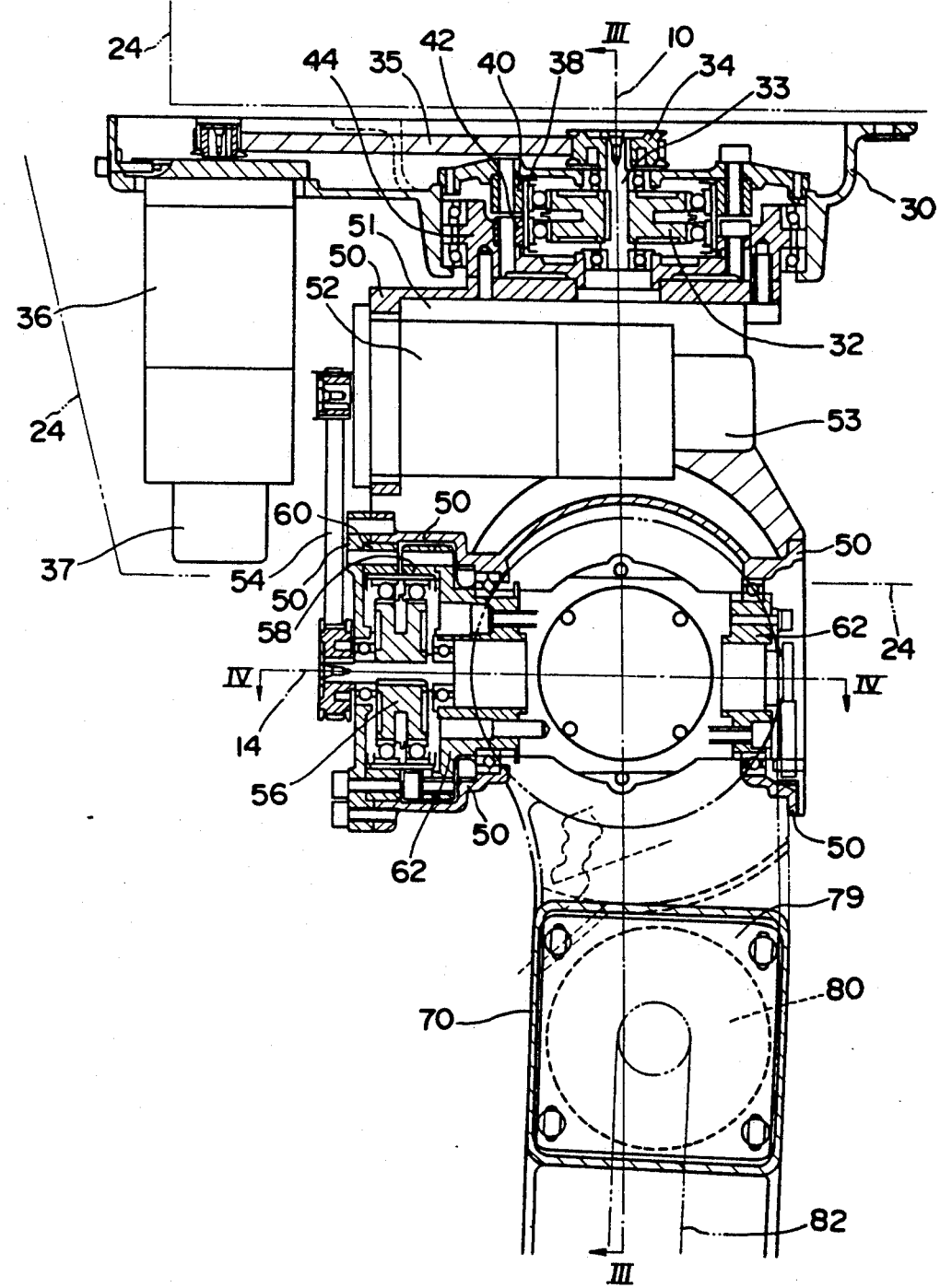
FIG. 2 is an enlarged vertical cross sectional view of a hip joint assembly of the articulated structure.
Figure 3:
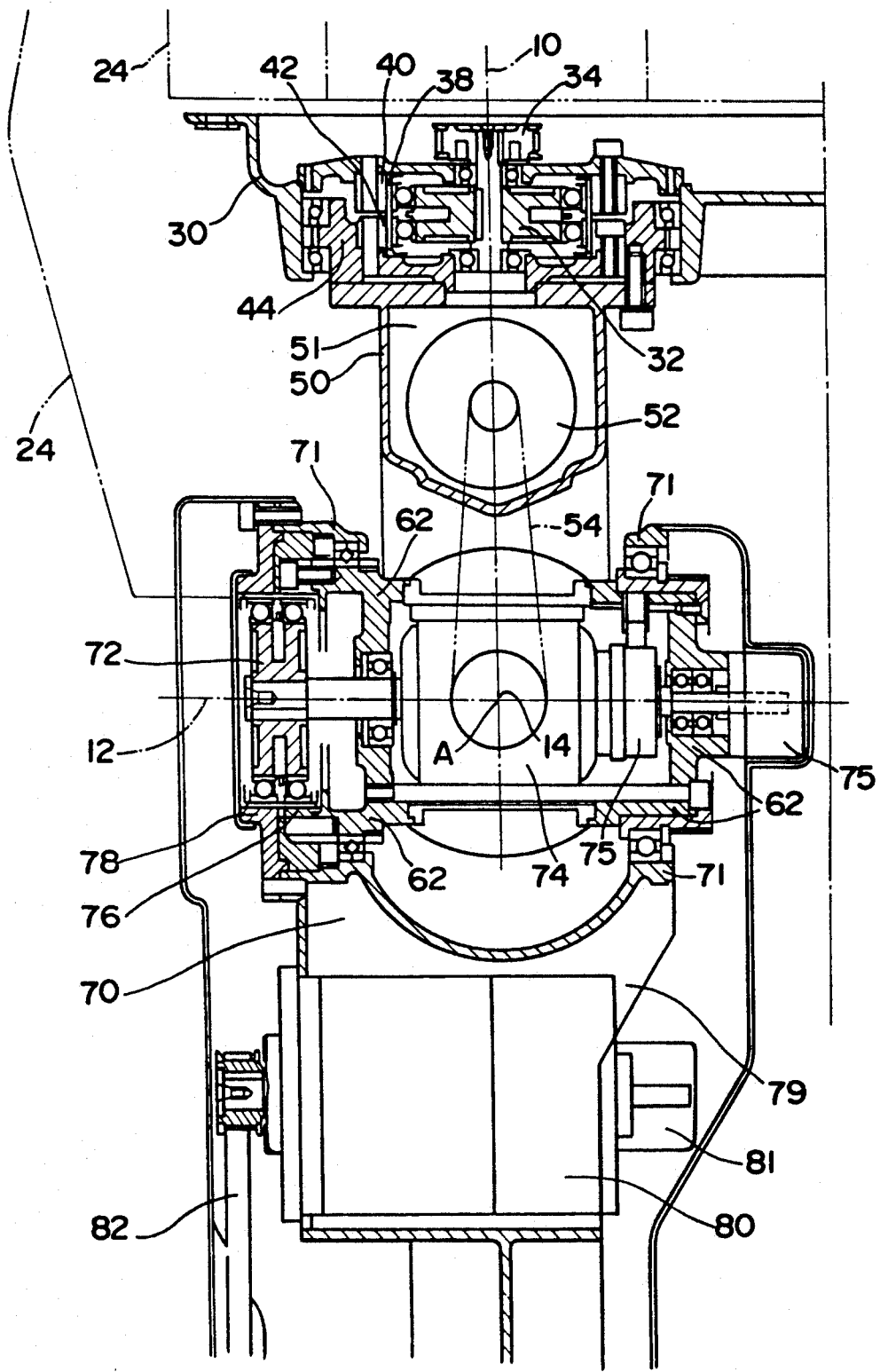
FIG. 3 is a cross-sectional view taken along line III—III of FIG. 2.
Figure 4:
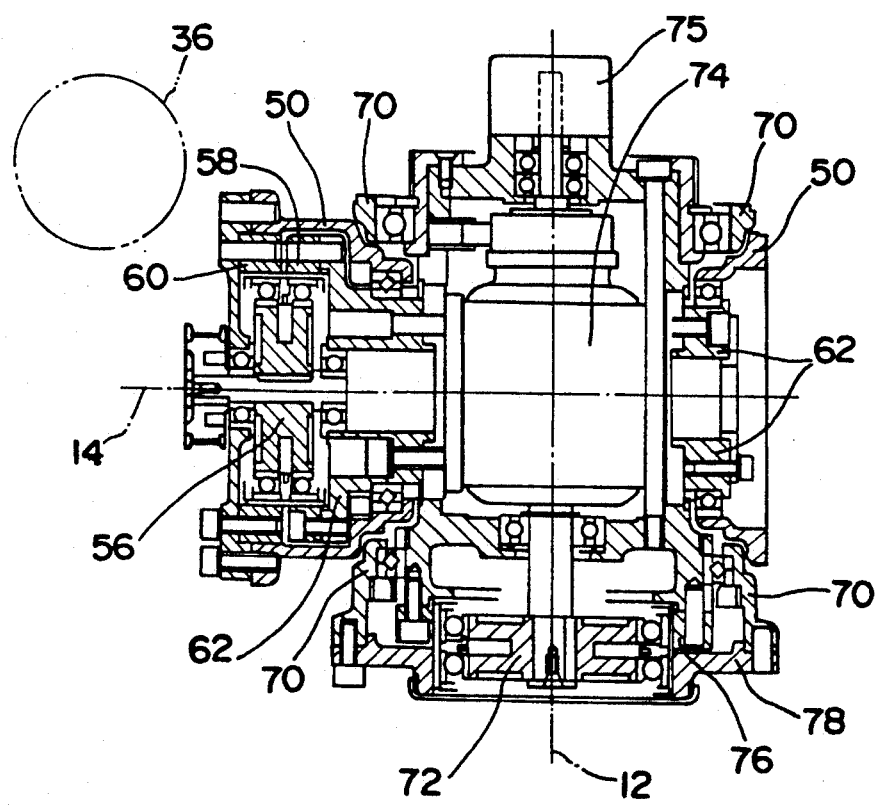
FIG. 4 is a cross-sectional view taken along line IV—IV of FIG. 2.

FIGS. 2 through 4 show the hip joint assembly in greater detail. The body 24 shown in FIGS. 2 and 3 houses therein a control unit comprising a microcomputer for controlling movements of the legged walking robot 1 and a battery for supplying electric energy to the control unit and various electric motors. As shown in FIG. 2, the body 24 is mounted on a pelvis plate 30. The legs are operatively coupled to the body 24 through the pelvis plate 30, and used for locomotion and support of the legged walking robot 1. The legs including the hip joint assemblies, as shown in FIG. 1, are structurally identical to each other and positioned symmetrically. Therefore, only one of the legs including the hip joint assemblies will be described below.

In FIG. 2, the pelvis plate 30 supports a first Harmonic (commercial name) speed reducer 32 having an input shaft 33 on which a pulley 34 is mounted. The pulley 34 is rotated by a belt 35 is actuated by a first electric motor 36 that is mounted on the pelvis plate 30 with its output shaft extending vertically. The speed of rotation of the input shaft 33 of the speed reducer 32 is reduced by relative movement between a flexible ring 38, a fixed ring 40, and an output ring 42 of the speed reducer 32. The fixed ring 40 is bolted to the pelvis plate 30, and the output ring 42 is bolted to a first output member 44. In response to the rotation applied from the first electric motor 36, the first output member 44 is rotated with respect to the pelvis plate 30 about the joint axis 10 Since the first electric motor 36 is fixedly mounted on the pelvis plate 30, the leg is not required to bear the weight of the first electric motor 36. The first electric motor 36 is positioned behind the leg in the direction in which the legged walking robot 1 moves in the forward (pitch) direction, so that the first electric motor 36 does not physically interfere with the leg in its pitching movement. The first electric motor 36 is also disposed relatively closely to the joint axis 10 to reduce the inertial moment about the vertical axis.

As shown in FIGS. 2 through, 4, a first yoke 50 is bolted to a lower surface of the first output member 44. The first yoke 50 has a hollow upper portion 51 which houses a second electric motor 52 with its output shaft extending horizontally and parallel to roll axis. Rotation from the second electric motor 52 is transmitted through a belt 54 to a second Harmonic speed reducer 56 which is supported in the first yoke 50 below the second electric motor 52. The second Harmonic speed reducer 56 reduces the speed of the applied rotation, and rotates an output ring 58 at a reduced speed with an increased torque. The second Harmonic speed reducer 56 has a fixed ring 60 bolted to a lower left-hand side (as viewed in FIGS. 3 and 4) of the first yoke 50 The output ring 58 is fixed through a second member 62 to an upper end of the thigh link 70, which is positioned beneath the first yoke 50. Therefore, when the second electric motor 52 is energized, the thigh link 70 is angularly moved relatively to the first yoke 50 about the joint axis 14. The leg is therefore angularly moved in the roll direction about the joint axis 14, i.e., makes a rolling movement about the joint axis 14. The second Harmonic speed reducer 56 is positioned behind the leg in close proximity with the joint axis 10.

The first or upper yoke 50 has a lower right-hand side serving as a bearing, which cooperates with the output member 62 in supporting the upper end of the thigh link 70. The second electric motor 52 which actuates the thigh link 70 is mounted on the first yoke 50, but not on the thigh link 70. Therefore, the thigh link 70 is not required to bear the weight of the second electric motor 52. The inertial mass to be actuated by the second electric motor 52 is therefore relatively small, and the torque to be produced by the second electric motor 52 may be small.

As shown in FIG. 3, the upper end of the thigh link 70 has a second yoke 71 composed of laterally spaced yoke members between which there are disposed and supported a third Harmonic speed reducer 72 and a third electric motor 74 for applying a torque thereto. The third Harmonic speed reducer 72 and the third electric motor 74 are horizontally aligned with each other. As shown in FIGS. 3 and 4, rotation from the third electric motor 74 is transmitted directly to the speed reducer 72 without any belt therebetween. The third Harmonic speed reducer 72 has a fixed ring 76 coupled to the second output member 62, and an output ring 78 coupled to the second yoke 71. Therefore, when the third electric motor 74 is energized, the second yoke 71 is rotated relatively to the output member 62, causing the thigh link 70 to angularly move about the joint axis 12. Thus, the thigh link 70 is angularly moved in the pitch direction about the joint axis 12, i.e., makes a pitching movement about the joint axis 12. The third electric motor 74 which actuates the thigh link 70 is not mounted on the thigh link 70, but on the output member 62, i.e., the first yoke 50. Accordingly, since the thigh link 70 is not required to bear the weight of the third electric motor 74, the inertial mass of the thigh link 70 is smaller by the weight of the third electric motor 74 than would be if the third electric motor 74 were mounted on the thigh link 70. As a result, the capacity or weight of the third electric motor 74 may be reduced. As shown in FIG. 4, the third Harmonic speed reducer 72 is positioned on an outer side of the leg remotely from the other leg, thus avoiding physical interference with the corresponding third Harmonic speed reducer on the other leg. The joint axes 10, 12, 14 perpendicularly intersect with each other at an intersection point A (FIG. 3), so that the angular positions of the joint axes 10, 12, 14 can be calculated through transformation of an orthogonal coordinate system.

As shown in FIG. 2, the thigh link 70 has a recess 79 defined in an upper end portion thereof and housing a fourth electric motor 80. Rotation from the fourth electric motor 80 is transmitted through a belt 82 to the knee joint 16. As shown in FIGS. 5 and 6, the belt 82 is trained around the input shaft of a fourth Harmonic speed reducer 84 mounted in the knee joint 16, which has a cavity 85 defined therein for a reduced weight. The fourth electric motor 80 is positioned as closely to the upper end of the thigh link 70 as possible. Therefore, the inertial mass of the thigh link 70 is reduced, and the center of gravity thereof is positioned in a relatively high position.

The knee joint 16 and the foot joint assembly are operatively coupled to each other by the shank link 86. The foot 22 is attached to the shank link remote or spaced apart from the knee joint 16. The shank link 86 has a recess 87 defined in an upper end thereof and housing a fifth electric motor 88. Rotation from the fifth electric motor 88 is transmitted through a belt 90 to a fifth Harmonic speed reducer 92 mounted in the ankle, for angularly moving the foot 22 in the pitch direction about the axis 18, i.e., making a pitching movement of the foot 22 about the axis 18. The foot 22 can also be angularly moved about the axis 20 in the roll direction by a sixth Harmonic speed reducer 94 mounted on the lower end of the shank link 86 and a sixth electric motor 96 disposed in the lower end of the shank link 86, for actuating the sixth Harmonic speed reducer 94.

The fifth electric motor 88 is positioned as closely to the upper end of the shank link 86 as possible. Thus, the inertial mass of the shank link 86 is reduced, and the center of gravity thereof is positioned in a relatively high position.

As described above, the pitch joint axes 12, 16, 18 extend parallel to each other. Since the joint 10 is positioned above these pitch joint axes 12, 16, 18, the pitch joint axes 12, 16, 18 are not disturbed by the joint 10, and positional calculations in an orthogonal coordinate system are allowed at all times when the legged walking robot 1 walks as well as turns.

Operation of the legged walking robot 1 will now be described below. As shown in FIGS. 2 through 6, the electric motors 36, 52, 74, 80, 88, 96 are associated with respective rotary encoders 37, 53, 75, 81, 89 (the rotary encoder combined with the sixth electric motor 96 is omitted from illustration) which detect angular displacements of the motor shafts. The ankle has a six-axis force sensor (FIGS. 5 and 6) for measuring an applied load, etc. Output signals from the rotary encoders and the force sensor are supplied to the control unit in the body 24. The CPU of the microcomputer in the control unit calculates present angular positions based on the supplied signals, searches for control values stored in a memory of the microcomputer, and energizes the electric motors in order to eliminate any differences between the present angular positions and the control values. Such a control process will not be described in detail as it has no direct bearing on the present invention. The control unit is housed in the body 24 in isolated relation to the electric motors so that the control unit will not be adversely affected by electromagnetic noise produced by the electric motors.

In the illustrated embodiment, the actuators for actuating the legs comprise relatively light electric motors rather than hydraulic actuators, and the pitch joint for making pitching movements in the hip joint assembly is positioned most closely to the thigh link. When each leg is to make a pitching movement, the weights of the actuators for actuating the other joints (axes) do not impose an undue load on the pitch joint in the hip joint assembly, and hence the actuator (third electric motor 74) for making pitching movements may be reduced in capacity or weight. The rotatable shafts of the third Harmonic speed reducer 72 and the third electric motor 74 are axially aligned with the pitch joint axis 12 about which the thigh link 70 makes pitching movements.

Therefore, the inertial masses of the third Harmonic speed reducer 72 and the third electric motor 74 are minimized from a theoretical standpoint. If the rotatable shafts of the third Harmonic speed reducer 72 and the third electric motor 74 were offset from the pitch joint axis 12, then their inertial masses would be increased in proportion to the distance by which their shafts were offset from the pitch joint axis 12, since the actual inertial masses would be the sum of the inherent inertial masses of the speed reducer 72 and the motor 74 and the square of (their masses × the offset distance). It is most reasonable to position the speed reducer and motor which make pitching movements, are of the greatest weights, and are most frequently energized, at the intersection of the joint axes 12, 14, and to position the other speed reducers and motors in other locations. The joint (roll joint) in the hip joint assembly, which requires a second largest torque and a second highest speed, is positioned immediately next to the pitch joint, and the leg turning joint in the hip joint assembly, which requires a smallest torque, a lowest speed, and a smallest change in the speed, and which is also least frequently used, is positioned in the highest location. Although all the other joints impose a load on the highest leg turning joint when the leg is to make a turning movement, since the turning movement itself is lower in speed than the pitching movement, no significantly large torque is required by the leg turning joint even if large inertial masses are applied thereto. The above arrangement of the joints is thus highly preferable from the above practical standpoint. The aforesaid joint layout is also effective for minimum energy consumption because the time required to make a turning movement is shorter than the time required to make a pitching movement.

The hip joint assembly illustrated in the above embodiment is highly compact with the second Harmonic speed reducer 56 positioned behind the leg in the pitch direction. When the thigh link 70 swings in the forward direction, it is not disturbed by any objects. Accordingly, the thigh link 70 is movable in a wide range in the pitch direction, allowing the legged walking robot 1 to take a crouching position. The third Harmonic speed reducer 72 is disposed on the outer side of the leg, so that the third Harmonic speed reducers 72 on the two legs are prevented from physically interfering with each other. As a result, the distance between the two legs is reduced. When one of the legs is in a transfer phase, the moment applied to the other leg in a support phase under a gravitational pull is reduced. Consequently, the capacity or weight of the second electric motor 52 of the roll joint is reduced, and so is the inertial mass of the leg.

The first electric motor 36 is positioned not only behind the leg, but also close to the vertical central axis of the legged walking robot 1. As a consequence, the inertial moment about the vertical axis of the legged walking robot is reduced, thereby allowing the legged walking robot to make movements lightly when it is controlled.

In the above embodiment, the electric motors for actuating some joints are positioned on components above the joints, and the speed reducers are positioned in these joints, respectively, with their output shafts axially aligned with the joints, the speed reducers being operatively coupled to the electric motors through belts. Therefore, the inertial moments applied to the electric motors are reduced without substantially increasing the weight of the overall leg, and the robot has a high center of gravity. It is effective to position the electric motors at as high locations as possible, because even though the distances between the electric motors and the speed reducers are large, the belts extending therebetween are only required to transmit relatively small motor torques before the speed of rotation is reduced. Since the belts may be slender and light, they do not add a substantial weight to the leg.

The hip joint assembly, the knee joint, and the foot joint assembly are relatively positioned such that the pitch joint axes 12, 16, 18 remain parallel to each other at all times. Therefore, a leg in a transfer phase moves along a simple path, which can easily be calculated in a short period of time when the leg is to be placed in any desired position and direction without the body's being not changed in position and posture.

The speed reducers are not limited to the illustrated Harmonic speed reducers, but may be speed reducers comprising gears.

The belts may or may not reduce the speed of rotation which is transmitted thereby.

The rotary encoders for detecting angular displacements of the electric motors may be replaced with potentiometers or any of other angular displacement transducers.

The present invention has been described as being incorporated in the articulated leg structure of a two-legged walking robot. However, the principles of the present invention as also applicable to an articulated leg structure for a multi-legged walking robot having three or more legs.

Although a certain preferred embodiment has been shown and described, it should be understood that many changes and modifications may be made therein without departing from the scope of the appended claims.

What is claimed is:

1. An articulated structure in a walking robot having legs comprising:
   a body;
   a pelvis plate supporting the body;
   a first motor attached to the pelvis plate and having an output shaft parallel to a yaw axis;
   a yaw joint including a first yoke rotatably attached to the pelvis plate through a first output member and pivotable abut the yaw axis;
   means for drivably connecting the output shaft of the first motor to the first yoke;
   a second motor supported by the first yoke and having an output shaft parallel to a roll axis perpendicular to the yaw axis and intersecting the yaw axis at an intersection point;
   a second output member rotatably attached to the first yoke;
   a roll joint including a second yoke rotatably attached to the second output member and pivotably about the roll axis;
   means for drivably connecting the output shaft of the second motor to the second yoke;
   a third motor supported on the second output member and having an output shaft parallel to a pitch axis with the output shaft of the third motor drivably connected to the second yoke, with the pitch axis intersection the intersection point and oriented perpendicular to the yaw axis and the roll axis; and
   a thigh link attached to the second yoke.

2. The articulated structure of claim 1 further comprising:

fourth motor supported on the thigh link adjacent to the second yoke, the fourth motor having an output shaft parallel to the pitch axis;

a shank link;

a knee joint pivotally connecting the shank link to thigh link;

means for drivably connecting the output shaft of the fourth motor to the knee joint.

3. The articulated structure of claim 2 further comprising:

a fifth motor supported on the shank link adjacent the knee joint and having an output shaft parallel to the pitch axis;

a foot attached to the shank link remote from the knee joint and pivotably on the shank link about axes parallel to the roll and pitch axes;

means for drivably connecting the output shaft of the fifth motor to the foot; and a sixth motor supported on the shank link and having an output shaft parallel to the roll axis and drivably connected to the foot.

4. The articulated structure of claim 1 further comprising a first speed reducer linking the first motor and the output shaft of the first motor, a second speed reducer linking the second motor and the output shaft of the second motor, and a third speed reducer linking the third motor and the output shaft of the third motor.

5. The articulated structure of claim 1 wherein the pelvis plate has a front and a back and the first motor is adjacent the back of the pelvis plate.

6. The articulated structure of claim 1 wherein the means for drivably connecting comprises a belt.

* * * * *